United States Patent
Park

(10) Patent No.: US 10,459,586 B2
(45) Date of Patent: Oct. 29, 2019

(54) TOUCH SENSOR AND METHOD OF MANUFACTURING THE SAME

(71) Applicant: Samsung Display Co., Ltd., Yongin-si (KR)

(72) Inventor: Yong Woo Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/175,455

(22) Filed: Oct. 30, 2018

(65) Prior Publication Data

US 2019/0073059 A1 Mar. 7, 2019

Related U.S. Application Data

(62) Division of application No. 15/226,566, filed on Aug. 2, 2016, now Pat. No. 10,146,384.

(30) Foreign Application Priority Data

Nov. 27, 2015 (KR) ........................ 10-2015-0167289

(51) Int. Cl.
*G06F 3/044* (2006.01)
(52) U.S. Cl.
CPC .... *G06F 3/044* (2013.01); *G06F 2203/04102* (2013.01); *G06F 2203/04103* (2013.01)
(58) Field of Classification Search
CPC ........... G06F 3/044; G06F 2203/04103; G06F 2203/04112
See application file for complete search history.

(56) References Cited

U.S. PATENT DOCUMENTS

| 6,947,103 | B2 | 9/2005 | Sakurai et al. |
| 2009/0242283 | A1 | 10/2009 | Chiu |

(Continued)

FOREIGN PATENT DOCUMENTS

| KR | 10-2014-0016070 | 2/2014 |
| KR | 10-2014-0062991 | 5/2014 |

(Continued)

OTHER PUBLICATIONS

Notice of Allowance dated Jul. 31, 2018, in U.S. Appl. No. 15/226,566.

(Continued)

*Primary Examiner* — Koosha Sharifi-Tafreshi
(74) *Attorney, Agent, or Firm* — H.C. Park & Associates, PLC

(57) ABSTRACT

A touch sensor includes: a first organic layer including first recesses; first conductive patterns disposed in the first recesses; a second organic layer disposed on the first organic layer, the second organic layer covering at least some of the first conductive patterns and including second recesses; second conductive patterns disposed in the second recesses; and a third organic layer disposed on the second organic layer, the third organic layer covering at least some of the second conductive patterns. Some of the first and second conductive patterns form a driving line extending in a first direction. Some of the first and second conductive patterns form a sensing line extending in a second direction crossing the first direction. The touch sensor is configured to sense a touch based on a change in capacitance between the driving line and the sensing line.

5 Claims, 11 Drawing Sheets

(56) References Cited

U.S. PATENT DOCUMENTS

| | | | |
|---|---|---|---|
| 2012/0182254 A1 | 7/2012 | Jang et al. | |
| 2012/0223901 A1* | 9/2012 | Kim | G06F 3/044 345/173 |
| 2013/0106752 A1 | 5/2013 | Lin et al. | |
| 2014/0028584 A1 | 1/2014 | Park et al. | |
| 2014/0218637 A1* | 8/2014 | Gao | G06F 3/044 349/12 |
| 2014/0253827 A1* | 9/2014 | Gao | H05K 1/0298 349/12 |
| 2015/0022731 A1 | 1/2015 | Kang et al. | |
| 2015/0047957 A1 | 2/2015 | Tokuno et al. | |
| 2015/0346866 A1 | 12/2015 | Kusunoki et al. | |
| 2016/0179234 A1* | 6/2016 | Dan | G06F 3/041 345/174 |
| 2016/0266691 A1 | 9/2016 | Jang et al. | |

FOREIGN PATENT DOCUMENTS

| | | |
|---|---|---|
| KR | 10-2014-0123025 | 10/2014 |
| KR | 10-2014-0138685 | 12/2014 |
| KR | 10-2015-0050530 | 5/2015 |
| KR | 10-0536328 | 12/2015 |

OTHER PUBLICATIONS

Final Office Action dated May 18, 2018, in U.S. Appl. No. 15/226,566.

Non-Final Office Action dated Jan. 17, 2018, in U.S. Appl. No. 15/226,566.

\* cited by examiner

TOUCH SENSOR AND METHOD OF MANUFACTURING THE SAME

CROSS-REFERENCE TO RELATED APPLICATIONS

This application is a Divisional of U.S. patent application Ser. No. 15/226,566, filed Aug. 2, 2016, and claims priority from and the benefit of Korean Patent Application No. 10-2015-0167289, filed Nov. 27, 2015, each of which is hereby incorporated by reference for all purposes as if fully set forth herein.

BACKGROUND

Field

One or more exemplary embodiments relate to an apparatus and a method, and, more particularly, to a touch sensor and a method of manufacturing the same.

Discussion

With the development of flexible display devices has come an interest in flexible touch sensors for interface devices to the flexible display devices. Although a flexible touch sensor may be formed of a flexible material, the flexible touch sensor may still be broken (or otherwise damaged) as a result of bending stresses generated when a flexible display device is bent (or otherwise flexed). A need, therefore, exists for more robust flexible touch sensors configured to withstand stresses generated in association with the bending of a flexible display device including such flexible touch sensors.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a flexible touch sensor configured to be more robust against applied bending stress.

One or more exemplary embodiments provide a method of manufacturing a flexible touch sensor configured to be more robust against applied bending stress.

Additional aspects will be set forth in the detailed description which follows, and, in part, will be apparent from the disclosure, or may be learned by practice of the inventive concept.

According to one or more exemplary embodiments, a touch sensor includes: a first organic layer including first recesses; first conductive patterns disposed in the first recesses; a second organic layer disposed on the first organic layer, the second organic layer covering at least some of the first conductive patterns and including second recesses; second conductive patterns disposed in the second recesses; and a third organic layer disposed on the second organic layer, the third organic layer covering at least some of the second conductive patterns. Some of the first and second conductive patterns form a driving line extending in a first direction. Some of the first and second conductive patterns form a sensing line extending in a second direction crossing the first direction. The touch sensor is configured to sense a touch based on a change in capacitance between the driving line and the sensing line.

According to one or more exemplary embodiments, a method of manufacturing a touch sensor includes: forming a first photosensitive organic layer; exposing a first portion of the first photosensitive organic layer to a first light to form a first organic layer; removing second portions of the first photosensitive organic layer unexposed to the first light to form first recesses in the first organic layer; forming first conductive patterns in the first recesses; forming a second photosensitive organic layer on the first organic layer and the first conductive patterns; exposing a first portion of the second photosensitive organic layer to a second light to form a second organic layer; removing second portions of the second photosensitive organic layer unexposed to the second light to form second recesses in the second organic layer; and forming second conductive patterns in the second recesses. Some of the first and second conductive patterns form a driving line of a touch sensor, the driving line extending in a first direction. Some of the first and second conductive patterns form a sensing line of the touch sensor, the sensing line extending in a second direction different from the first direction.

According to one or more exemplary embodiments, a touch sensor includes: organic layers disposed on one another; driving electrodes at least partially buried in at least one organic layer of the organic layers, the driving electrodes extending in a first direction; sensing electrodes at least partially buried in at least one organic layer of the organic layers, the sensing electrodes extending in a second direction crossing the first direction; and a bridge pattern at least partially buried in at least two organic layers of the organic layers. A first portion of the bridge pattern electrically connects adjacent driving electrodes to one another. A second portion of the bridge pattern electrically connects adjacent sensing electrodes to one another, the second portion of the bridge pattern being at least partially buried in a different organic layer of the organic layers than the first portion of the bridge pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
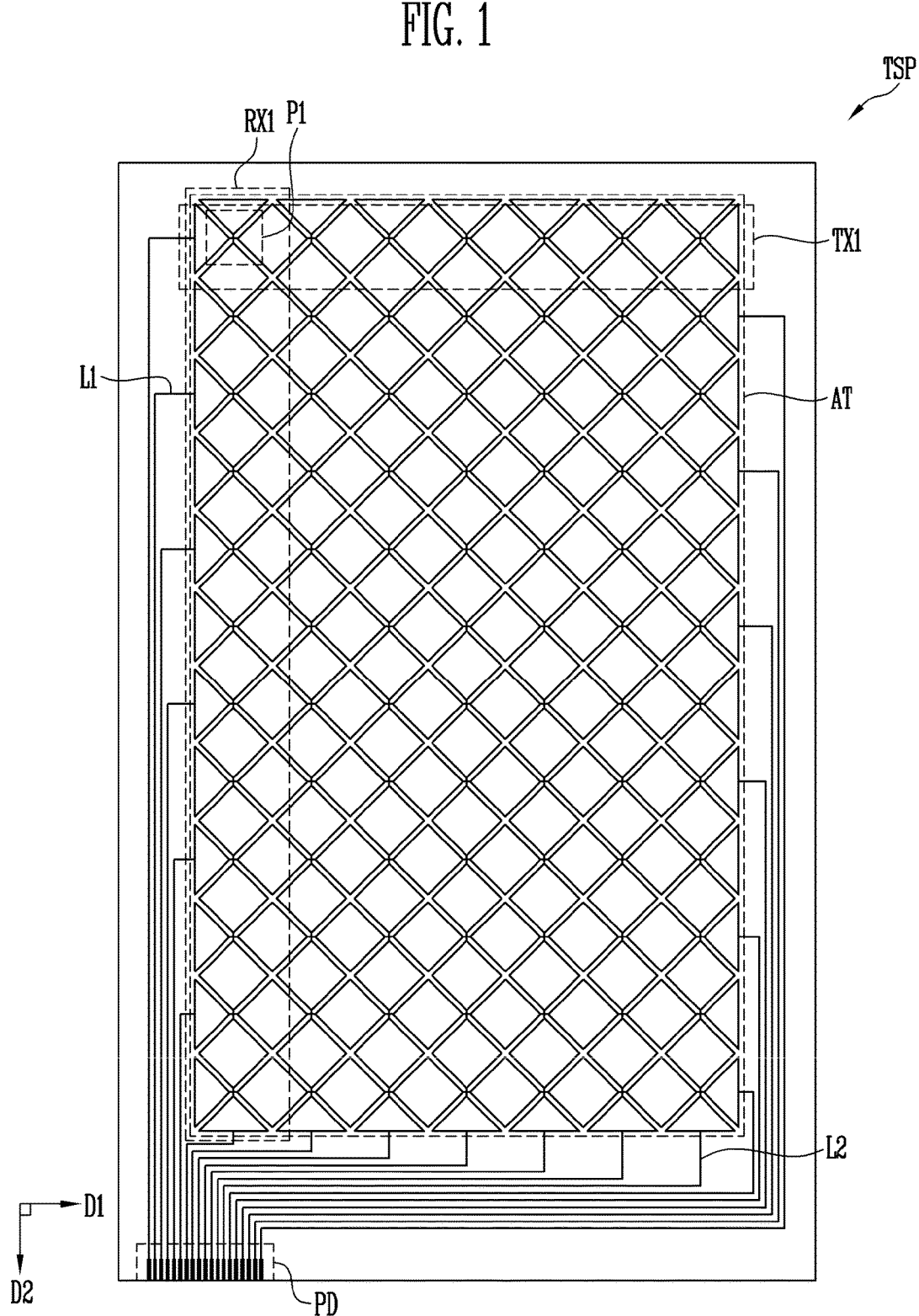
FIG. 1 is a diagram of a touch sensor, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the D1-axis, the D2-axis, and a D3-axis extending out of the page are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
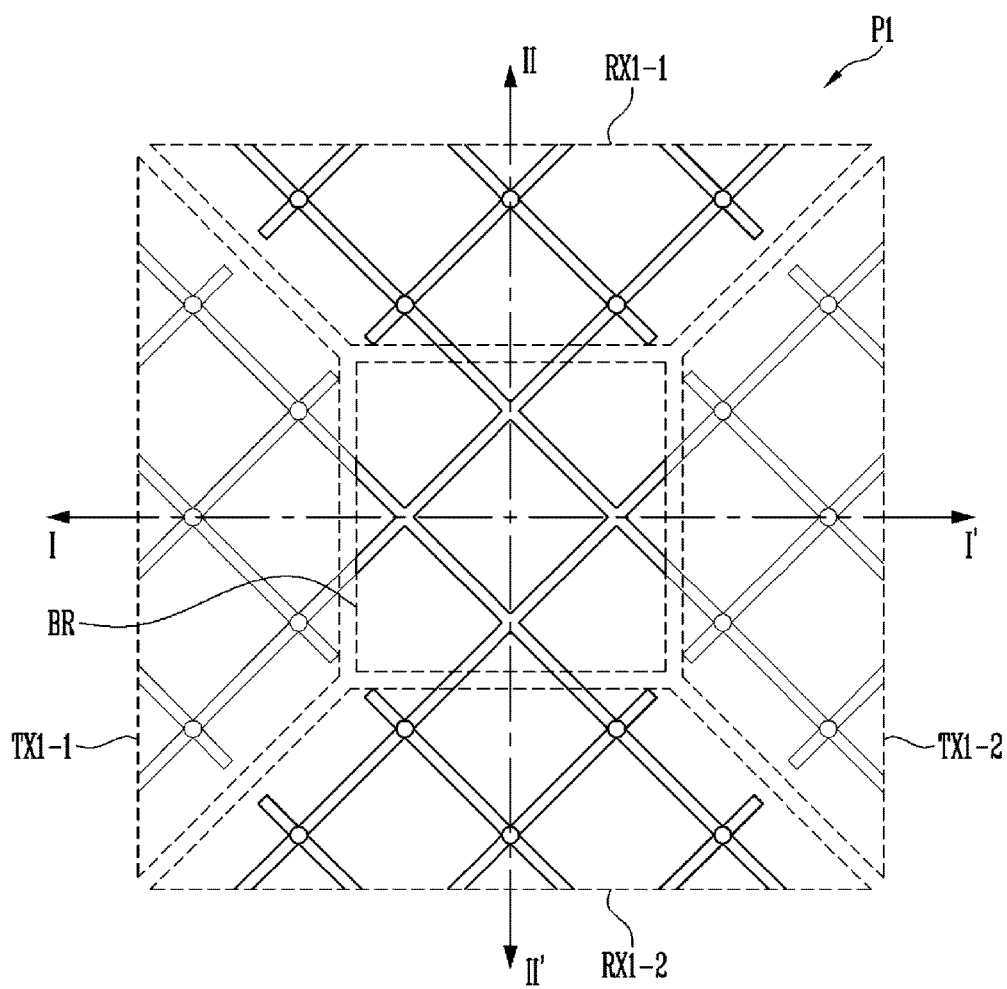
FIG. 2 is an enlarged plan view of portion P1 of the touch sensor of FIG. 1, according to one or more exemplary embodiments.
Figure 3:
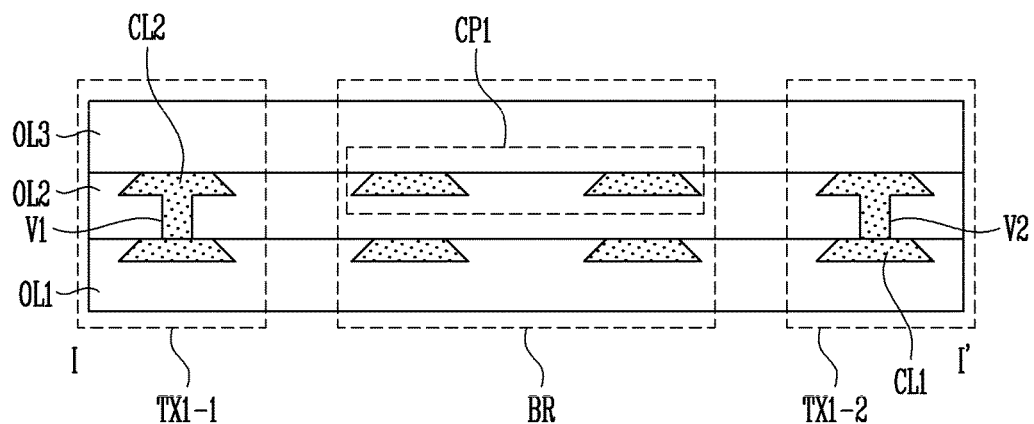
FIG. 3 is a cross-sectional view of the touch sensor of FIG. 2 taken along sectional line I-I', according to one or more exemplary embodiments.
Figure 4:
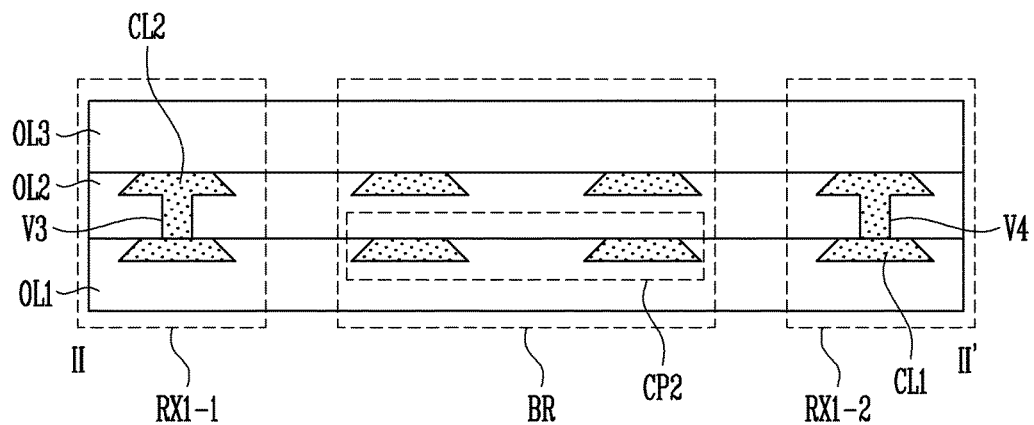
FIG. 4 is a cross-sectional view of the touch sensor of FIG. 2 taken along sectional line according to one or more exemplary embodiments.

FIG. 1 is a diagram of a touch sensor, according to one or more exemplary embodiments. FIG. 2 is an enlarged plan view of portion P1 of the touch sensor of FIG. 1, according to one or more exemplary embodiments. FIG. 3 is a cross-sectional view of the touch sensor of FIG. 2 taken along sectional line I-I', according to one or more exemplary embodiments. FIG. 4 is a cross-sectional view of the touch sensor of FIG. 2 taken along sectional line according to one or more exemplary embodiments.

Referring to FIG. 1, a touch sensor TSP includes driving lines extending along a first direction D1 in an active area AT and sensing lines extending along a second direction D2 crossing the first direction D1 in an active area AT. For descriptive convenience, a representative driving line TX1 among the driving lines and a representative sensing line RX1 among the sensing lines will be described. According to one or more exemplary embodiments, the driving line TX1 may include a plurality of lines forming shapes arranged in the first direction D1. For example, the lines of the driving line TX1 may form diamond-shapes. It is contemplated, however, that any suitable shape may be utilized in association with exemplary embodiments described herein. The sensing line RX1 may include a plurality of lines forming shapes arranged in the second direction D2. For instance, the lines of the sensing line RX1 may form the same shapes as the lines of the driving line TX1. It is contemplated, however, that the shapes of the sensing line RX1 may be different from the shapes of the driving line TX1. The touch sensor TSP may further include a pad portion PD, first connection lines L1 connecting a part of the pad portion PD to the driving lines, and second connection lines L2 connecting another part of the pad portion PD to the sensing lines. The pad portion PD may enable the touch sensor TSP (or one or more components thereof) to interface with another component, such as a controller.

Referring to FIG. 2, portion P1 of FIG. 1 includes first and second driving electrodes TX1-1 and TX1-2, first and second sensing electrodes RX1-1 and RX1-2, and a bridge pattern BR. The first and second driving electrodes TX1-1 and TX1-2 are arranged in the first direction D1, whereas the first and second sensing electrodes RX1-1 and RX1-2 are arranged in the second direction D2. The bridge pattern BR electrically connects the first driving electrode TX1-1 and the second driving electrode TX1-2, and electrically connects the first sensing electrode RX1-1 and the second sensing electrode RX1-2. It is noted, however, that the bridge pattern BR electrically insulates the first and second driving electrodes TX1-1 and TX1-2 from the first and second sensing electrodes RX1-1 and RX1-2.

Referring to FIGS. 3 and 4, the touch sensor TSP includes a first organic layer OL1, first conducive patterns CL1, a second organic layer OL2, second conductive patterns CL2, and a third organic layer OL3.

The first through third organic layers OL1 through OL3 are sequentially stacked on one another. Each of the first through third organic layers OL1 through OL3 may extend along the first direction D1 and the second direction D2 in the active area AT. First recesses are formed in an upper surface of the first organic layer OL1. The first conductive patterns CL1 are disposed (or otherwise formed) in the first recesses. The second organic layer OL2 is disposed on the first organic layer OL1 and covers at least a portion of the first conductive patterns CL1. Second recesses are formed in an upper surface of the second organic layer OL2. At least some of the second recesses include a via-hole passing through the second organic layer OL2. The second conductive patterns CL2 are disposed in the second recesses.

The first and second conductive patterns CL1 and CL2 of the first driving electrode TX1-1 are connected to each other through a first via-hole V1, and the first and second conductive patterns CL1 and CL2 of the second driving electrode TX1-2 are connected each other through a second via-hole V2, as shown in FIG. 3. Further, the first and second conductive patterns CL1 and CL2 of the first sensing electrode RX1-1 are connected each other through a third via-hole V3, and the first and second conductive patterns CL1 and CL2 of the second sensing electrode RX1-2 are connected to each other through a fourth via-hole V4, as shown in FIG. 4. The third organic layer OL3 is disposed on the second organic layer OL2, and covers at least a portion of the second conductive patterns CL2.

The first and second driving electrodes TX1-1 and TX1-2 and the first and second sensing electrodes RX1-1 and RX1-2 include a portion of the first conductive patterns CL1 and a portion of the second conductive patterns CL2. A first connection pattern CP1 includes a portion of the second conductive patterns CL2 and a second connection pattern CP2 includes a portion of the first conductive patterns CL1.

The first and second conductive patterns CL1 and CL2 used as the first and second driving electrodes TX1-1 and TX1-2 may be buried in at least one of the first through third organic layers OL1 through OL3. The first and second conductive patterns CL1 and CL2 used as the first and second sensing electrodes RX1-1 and RX1-2 may be buried in at least one of the first through third organic layers OL1 through OL3. In this manner, the first and second driving electrodes TX1-1 and TX1-2 and first and second sensing electrodes RX1-1 and RX1-2 may be buried in at least one of the first through third organic layers OL1 through OL3. It is also contemplated that at least one of the first and second driving electrodes TX1-1 and TX1-2 and the first and second sensing electrodes RX1-1 and RX1-2 may buried in more than one of the first through third organic layers OL1 through OL3.

According to one or more exemplary embodiments, the first and second driving electrodes TX1-1 and TX1-2 may be buried in the same organic layers (e.g., first and second organic layers OL1 and OL2) as the first and second sensing electrodes RX1-1 and RX1-2, as shown in FIGS. 3 and 4. It is contemplated, however, that at least one of the first and second driving electrodes TX1-1 and TX1-2 may be buried in a different organic layer than at least one of the first and second sensing electrodes RX1-1 and RX1-2.

The bridge pattern BR includes the first connection pattern CP1 and the second connection pattern CP2. The first connection pattern CP1 connects the first driving electrode TX1-1 of the second conductive patterns CL2 and the second driving electrode TX1-2 of the second conductive patterns CL2 together. The second connection pattern CP2 connects the first sensing electrode RX1-1 of the second conductive patterns CL2 and the second sensing electrode RX1-2 of the first conductive patterns CL1 together. In this manner, the driving line TX1 shown in FIG. 1 includes the first and second driving electrodes TX1-1 and TX1-2 and the first connection pattern CP1, and the sensing line RX1 shown in FIG. 1 includes the first and second sensing electrodes RX1-1 and RX1-2 and the second connection pattern CP2.

According to one or more exemplary embodiments, the first organic layer OL1 to the third organic layer OL3 are flexible. The first organic layer OL1 to the third organic layer OL3 may be formed by being exposed by at least a portion of a negative photosensitive organic material. For example, when the organic layer is selectively exposed after a negative photosensitive organic material is applied, a portion of the organic layer, which receives light, will be cured, but another portion of the organic layer, which does not receive light, will not cured. In this manner, the first to third organic layers OL1 to OL3 having desired shapes may be formed by removing the non-cured portions. To this end, the first organic layer OL1 to the third organic layer OL3 may include an acryl-based material or a siloxane-based material. It is contemplated, however, that any other suitable material may be utilized in association with exemplary embodiments described herein. A method of manufacturing the touch sensor TSP will be described in more detail with reference to FIGS. 12 to 23. According to one or more exemplary embodiments, a thickness of each of the first organic layer OL1 to the third organic layer OL3 may be 0.5 µm or more and 1.5 µm or less.

In one or more exemplary embodiments, the first conductive patterns CL1 and the second conductive patterns CL2 may have a positive slope. For instance, a first (e.g., lower) portion of a first or second conductive pattern CL1 and CL2 may be wider than a second (e.g., higher) portion of the first or second conductive pattern CL1 and CL2. In this manner, surfaces (e.g., lateral surfaces) connecting the first and second portions of the first or second conductive patterns CL1 and CL2 may slope from the wider portions to the narrower portions when viewed in a cross-sectional view, such as seen in FIGS. 3 and 4. In one or more exemplary embodiments, at least a portion of the first conductive patterns CL1 and a portion of the second conductive patterns CL2 may include at least one metal material, such as aluminum (Al), copper (Cu), silver (Ag), etc. A material of the first conductive patterns CL1 may be substantially the same as a material of the second conductive patterns CL2.

According to one or more exemplary embodiments, the first organic layer OL1 to the third organic layer OL3 and the first conductive patterns CL1 and the second conductive patterns CL2 are flexible so that when external force is applied, the entire touch sensor TSP is flexible. Further, the first conductive patterns CL1 and the second conductive patterns CL2 may be disposed in the first recesses formed in the first organic layer OL1 and the second recesses formed in the second organic layer OL2, respectively. In this manner, being stress applied to the first conductive patterns CL1 and the second conductive patterns CL2 may be dispersed (and may decrease at interfaces between components) when the touch sensor TSP is bent, as compared to first and second conductive patterns that are provided as separate layers, e.g., not formed in recesses of corresponding underlying layers. To this end, the touch sensor TSP may be more robust to stress (e.g., bending stress) generated when the touch sensor TSP is bent during, for instance, use of the touch sensor TSP.

Figure 5:
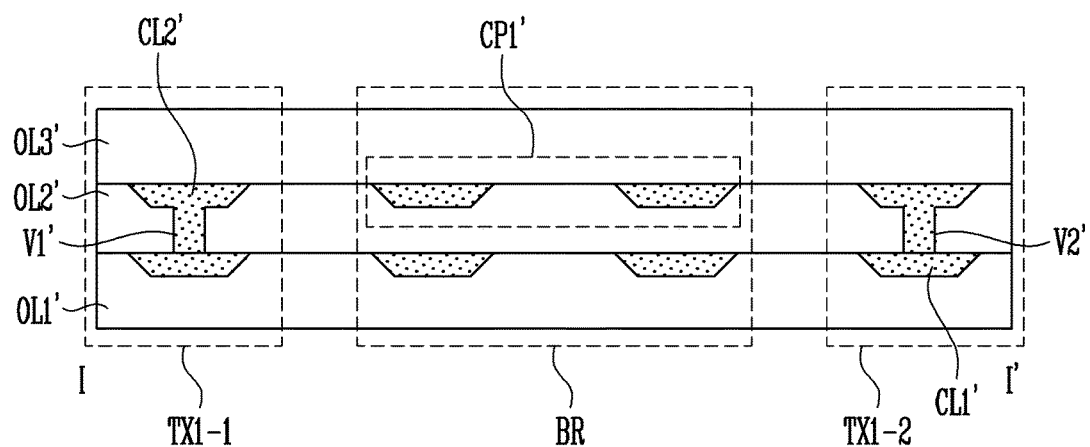
FIG. 5 is a cross-sectional view of the touch sensor of FIG. 2 taken along sectional line I-I', according to one or more exemplary embodiments.
Figure 6:
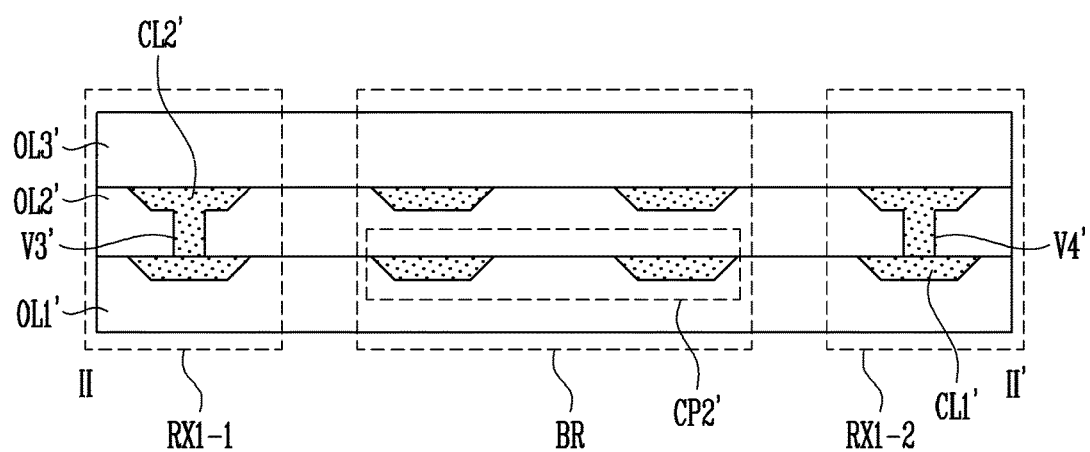
FIG. 6 is a cross-sectional view of the touch sensor of FIG. 2 taken along sectional line according to one or more exemplary embodiments.

FIG. 5 is a cross-sectional view of the touch sensor of FIG. 2 taken along sectional line I-I', according to one or more exemplary embodiments. FIG. 6 is a cross-sectional view of the touch sensor of FIG. 2 taken along sectional line according to one or more exemplary embodiments. The touch sensor of FIGS. 5 and 6 is similar to the touch sensor of FIGS. 1-4, and, therefore, duplicative descriptions have been avoided to prevent obscuring exemplary embodiments described herein.

Referring to FIGS. 5 and 6, the touch sensor includes a first organic layer OL1', first conductive patterns CL1', a second organic layer OL2', second conductive patterns CL2', and a third organic layer OL3'.

First recesses are formed in an upper surface of the first organic layer OL1'. The first conductive patterns CL1' are disposed (or otherwise formed) in at least some of the first recesses. The second organic layer OL2' is disposed on the first organic layer OL1', and covers at least a portion of the first conductive patterns CL1'. Second recesses are formed in an upper surface of the second organic layer OL2'. At least some of the second recesses include a via-hole passing through the second organic layer OL2'. The second conductive patterns CL2' are disposed in at least some of the second recesses.

The first and second conductive patterns CL1' and CL2' of the first driving electrode TX1-1 are connected to each other through a first via-hole V1', and the first and second conductive patterns CL1' and CL2' of the second driving electrode TX1-2 are connected to each other through a second via-hole V2', as shown in FIG. 5. Further, the first and second conductive patterns CL1' and CL2' of the first sensing electrode RX1-1 are connected to each other through a third via-hole V3', and the first and second conductive patterns CL1' and CL2' of the second sensing electrode RX1-2 are connected to each other through a fourth via-hole V4', as shown in FIG. 6. The third organic layer OL3' is disposed on the second organic layer OL2', and covers at least a portion of the second conductive patterns CL2'.

According to one or more exemplary embodiments, a material of the first conductive patterns CL1' and the second conductive patterns CL2' may correspond to a material of the first conductive patterns CL1 and the second conductive patterns CL2 described in association with FIGS. 1 to 4. To this end, the first organic layer OL1' to the third organic layer OL3' may be formed by being exposed by at least a portion of a negative photosensitive organic material, similar to the first organic layer OL1 to the third organic layer OL3. In this manner, the first organic layer OL1' to the third organic layer OL3' may include an acryl-based material or a siloxane-based material, similar to the first organic layer OL1 to the third organic layer OL3. It is contemplated, however, that any other suitable material may be utilized in association with exemplary embodiments described herein.

In contrast to the features described in association with FIGS. 3 and 4, the first conductive patterns CL1' and the second conductive patterns CL2' may have a negative slope. For instance, a first (e.g., lower) portion of a first or second conductive pattern CL1' and CL2' may be narrower than a second (e.g., higher) portion of the first or second conductive pattern CL1' and CL2'. In this manner, surfaces (e.g., lateral surfaces) connecting the first and second portions of the first or second conductive patterns CL1' and CL2' may slope from the narrower portions to the wider portions when viewed in a cross-sectional view, such as seen in FIGS. 5 and 6.

According to one or more exemplary embodiments, the first organic layer OL1' to the third organic layer OL3' and the first conductive patterns CL1' and the second conductive patterns CL2' are flexible so that when external force is applied, the entire touch sensor is flexible. Further, the first conductive patterns CL1' and the second conductive patterns CL2' may be disposed in the first organic layer OL1' and the second organic layer OL2', respectively. In this manner, bending stress applied to the first conductive patterns CL1' and the second conductive patterns CL2' may be dispersed (and may decrease at interfaces between components) when the touch sensor is bent, as compared to first and second conductive patterns that are provided as separate layers, e.g., not formed in recesses of corresponding underlying layers. This end, the touch sensor may be more robust to stress (e.g., bending stress) generated when the touch sensor is bent during, for example, use of the touch sensor.

According to the kind of electronic device (for example, a display device) incorporating the touch sensor, the electronic device may be bent such that an edge portion of the touch sensor is positioned higher than the center of the touch sensor or lower than the center of the touch sensor. For instance, a bending direction of the electronic device may be established according to the shape and the type of electronic device adopting the touch sensor. In one or more exemplary embodiments, the shapes and the slopes of the first recesses and the second recesses may be formed and may be optimized according to the shape, the type, and the intended bending direction of the electronic device. For example, a positive slope, such as utilized in association with the first conductive patterns CL1 and the second conductive patterns CL2 shown in FIGS. 3 and 4, may be more resilient to stress generated when the edge portion of the touch sensor is positioned higher than the center of the touch sensor. To this end, a negative slope, such as utilized in association with the first conductive patterns CL1' and the second conductive patterns CL2' shown in FIGS. 5 and 6, may be more resilient to stress generated when the edge portion of the touch sensor is positioned lower than the center of the touch sensor. In this manner, a touch sensor including first and second conductive patterns CL1 and CL2 or including first and second conductive patterns CL1' and CL2' may be selected and used according to the intended bending direction of the touch sensor.

Figure 7:
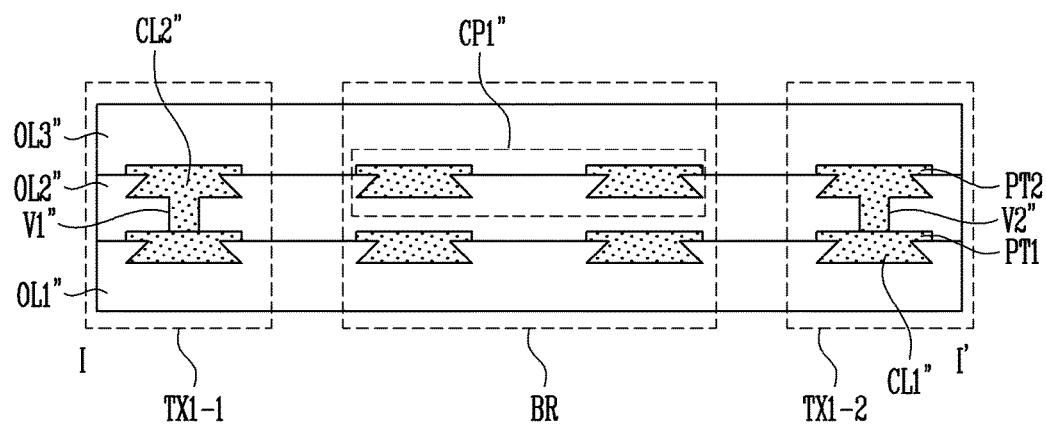
FIG. 7 is a cross-sectional view of the touch sensor of FIG. 2 taken along sectional line I-I', according to one or more exemplary embodiments.
Figure 8:
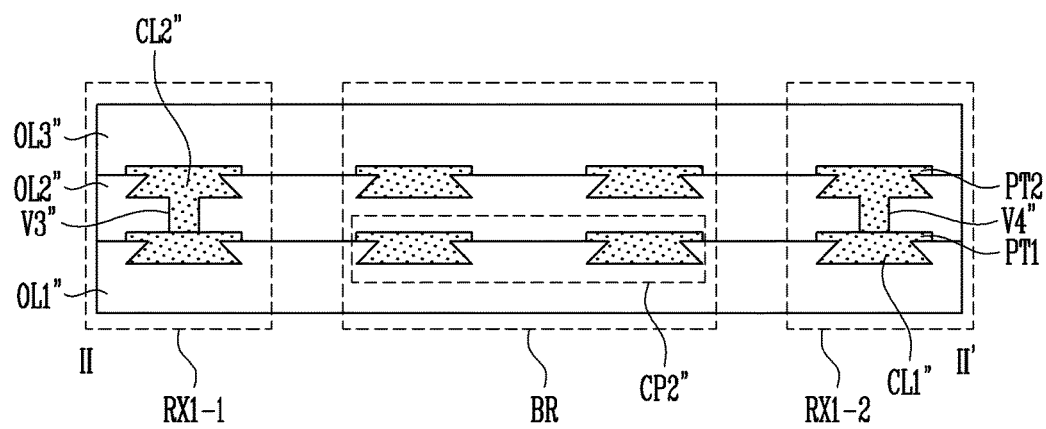
FIG. 8 is a cross-sectional view of the touch sensor of FIG. 2 taken along sectional line according to one or more exemplary embodiments.

FIG. 7 is a cross-sectional view of the touch sensor of FIG. 2 taken along sectional line I-I', according to one or more exemplary embodiments. FIG. 8 is a cross-sectional view of the touch sensor of FIG. 2 taken along sectional line according to one or more exemplary embodiments. The touch sensor of FIGS. 7 and 8 is similar to the touch sensors of FIGS. 1-6, and, therefore, duplicative descriptions have been avoided to prevent obscuring exemplary embodiments described herein.

Referring to FIGS. 7 and 8, the touch sensor includes a first organic layer OL1", first conductive patterns CL1", a second organic layer OL2", second conductive patterns CL2", a third organic layer OL3", first protrusions PT1, and second protrusions PT2.

First recesses are formed in an upper surface of the first organic layer OL1". The first conductive patterns CL1" are disposed (or otherwise formed) in at least some of the first recesses. The second organic layer OL2" is disposed on the first organic layer OL1", and covers at least a portion of the first conductive patterns CL1". Second recesses are formed in an upper surface of the second organic layer OL2". At least some of the second recesses include a via-hole passing through the second organic layer OL2". The second conductive patterns CL2" are disposed in at least some of the second recesses.

The first and second conductive patterns CL1" and CL2" of the first driving electrode TX1-1 are connected to each other through a first via-hole V1", and the first and second conductive patterns CL1" and CL2" of the second driving electrode TX1-2 are connected to each other through a second via-hole V2", as shown in FIG. 7. Further, the first and second conductive patterns CL1" and CL2" of the first sensing electrode RX1-1 are connected to each other through a third via-hole V3", and the first and second conductive patterns CL1" and CL2" of the second sensing electrode RX1-2 are connected to each other through a fourth via-hole V4", as shown in FIG. 8. The third organic layer OL3" is disposed on the second organic layer OL2", and covers at least a portion of the second conductive patterns CL2".

According to one or more exemplary embodiments, the first protrusions PT1 protrude beyond the upper surface of the first organic layer OL1", and the second protrusions PT2 protrude beyond the upper surface of the second organic layer OL2". To this end, the first protrusions PT1 may extend into the second organic layer OL2", and the second protrusions PT2 may extend into the third organic layer OL3". Further, the first protrusions PT1 and the second protrusions PT2 have conductivity. In this manner, an electric flow may be smooth between the first conductive patterns CL1" and the second conductive patterns CL2" by the first protrusions PT1 and/or the second protrusions PT2. In one or more exemplary embodiments, the first protrusions PT1 or the second protrusions PT2 may be omitted.

According to one or more exemplary embodiments, the first protrusions PT1 and/or the second protrusions PT2 may be formed during the formation of the first conductive patterns CL1" and the second conductive patterns CL2", respectively, and, thereby, with the same material. In one or more exemplary embodiments, the first protrusions PT1 and/or the second protrusions PT2 may be formed of a different material than the first conductive patterns CL1" and the second conductive patterns CT2", respectively, and, thereby, during separate formation, etching, etc. processes after the first conductive patterns CL1" and the second conductive patterns CL2" are formed.

According to one or more exemplary embodiments, the touch sensors of FIGS. 1 to 8 may be utilized to detect whether a touch is made or a position of the touch using the driving line TX1, to which a voltage or a current is applied, and the sensing line RX1, to which a voltage and a current may not be supplied. However, exemplary embodiments are not limited thereto. It is also contemplated that a suitable line corresponding to a row and a suitable line corresponding to a column may be utilized in association with exemplary embodiments. For example, the touch sensor may employ sensing lines in both rows and columns, and may sense, by each of the electrodes, a touch in a specific area corresponding to each electrode. To this end, the second conductive patterns and the third organic layer may be omitted.

Figure 9:
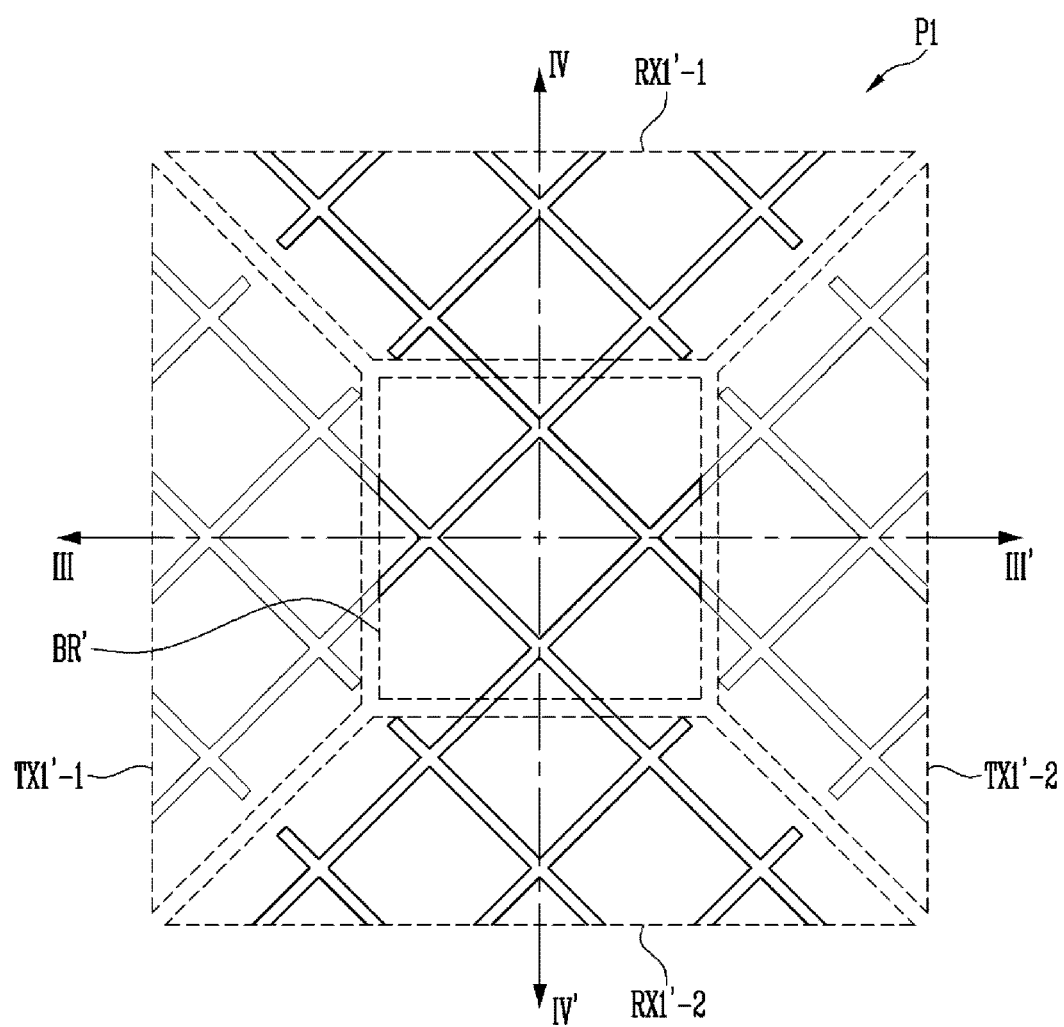
FIG. 9 is an enlarged plan view of portion P1 of the touch sensor of FIG. 1, according to one or more exemplary embodiments.
Figure 10:
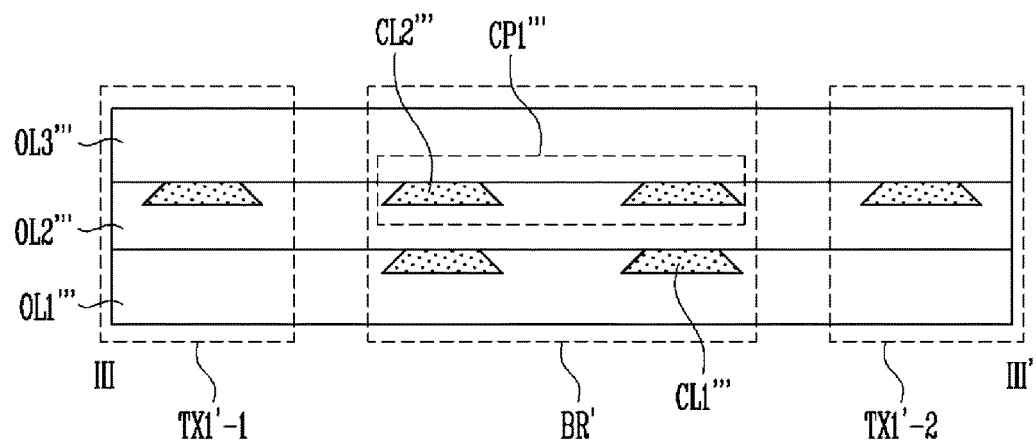
FIG. 10 is a cross-sectional view of the touch sensor of FIG. 9 taken along sectional line according to one or more exemplary embodiments.
Figure 11:
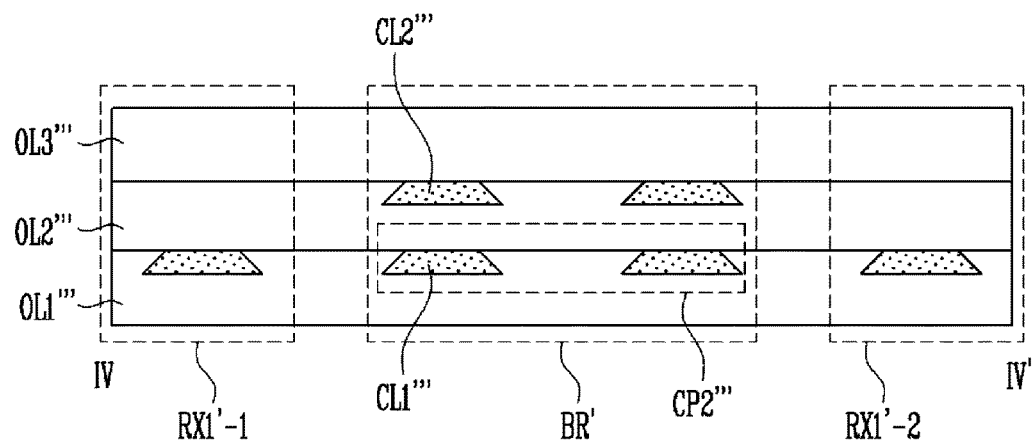
FIG. 11 is a cross-sectional view of the touch sensor of FIG. 9 taken along sectional line IV-IV', according to one or more exemplary embodiments.

FIG. 9 is an enlarged plan view of portion P1 of the touch sensor of FIG. 1, according to one or more exemplary embodiments. FIG. 10 is a cross-sectional view of the touch sensor of FIG. 9 taken along sectional line according to one or more exemplary embodiments, whereas FIG. 11 is a cross-sectional view of the touch sensor of FIG. 9 taken along sectional line IV-IV', according to one or more exemplary embodiments. The touch sensor of FIGS. 9 to 11 is similar to the touch sensor of FIGS. 1-8, and, therefore, duplicative descriptions have been avoided to prevent obscuring exemplary embodiments described herein.

Referring to FIG. 9, portion P1 of FIG. 1 may include first and second driving electrodes TX1'-1 and TX1'-2, first and second sensing electrodes RX1'-1 and RX1'-2, and bridge pattern BR'. The bridge pattern BR' electrically connects the first driving electrode TX1'-1 and the second driving' electrode TX1'-2 together, and the first sensing electrode RX1'-1 and the second sensing electrode RX1'-2 together. It is also noted that the bridge pattern BR' electrically insulates the first and second driving electrodes TX1'-1 and TX1'-2 from the first and second sensing electrodes RX1'-1 and RX1'-2.

Referring to FIGS. 10 and 11, the touch sensor includes a first organic layer OL1''', first conductive patterns CL1''', a second organic layer OL2''', second conductive patterns CL2''', and a third organic layer OL3'''.

First recesses are formed in an upper surface of the first organic layer OL1'''. The first conductive patterns CL1''' are disposed (or otherwise formed) in at least some of the first recesses. The second organic layer OL2''' is disposed on the first organic layer OL1''', and covers at least a portion of the first conductive patterns CL1'''. Second recesses are formed in an upper surface of the second organic layer OL2'''. Unlike the touch sensor illustrated in FIGS. 2 to 4, a via-hole is not formed in the second organic layer OL2''', and the second conductive patterns CL2''' are not connected with the first conductive patterns CL1'''. The third organic layer OL3''' is disposed on the second organic layer OL2''', and covers at least a portion of the second conductive patterns CL2''', which are formed in at least some of the second recesses.

The bridge pattern BR' includes a first connection pattern CP1''' and a second connection pattern CP2'''. The first connection pattern CP1''' connects the first driving electrode portion TX1'-1 of the second conductive patterns CL2''' and the second driving electrode portion TX1'-2 of the second conductive patterns CL2'''. The second connection pattern CP2''' connects the first sensing electrode portion RX1'-1 of the first conductive patterns CL1''' and the second sensing electrode portion RX1'-2 of the first conductive patterns CL1'''. In this manner, the first conductive patterns CL1''' may configure the first and second sensing electrodes RX1'-1 and RX1'-2 and the second connection pattern CP2''', and the second conductive patterns CL2''' may configure the first and second driving electrodes TX1'-1 and TX1'-2 and the first connection pattern CP1'''. That is, the driving line TX1 shown in FIG. 1 includes the first and second driving electrodes TX1'-1 and TX1'-2 and the first connection pattern CP1''', and the sensing line RX1 shown in FIG. 1 includes the first and second sensing electrodes RX1'-1 and RX1'-2 and the second connection pattern CP2'''.

According to one or more exemplary embodiments, the second connection pattern CP2''' in the bridge pattern BR' and the first and second sensing electrodes RX1'-1 and RX1'-2 include a portion of the first conductive patterns CL1''', and the first connection pattern CP1''' in the bridge pattern BR' and the first and second driving electrodes TX1'-1 and TX1'-2 includes a portion of the second conductive patterns CL2'''. In this manner, the sensing line RX1 includes a portion of the first conductive patterns CL1''', and the driving line TX1 includes a portion of the second conductive patterns CL2'''.

FIGS. 12 to 23 are respective cross-sectional views of a touch sensor at various stages of manufacture, according to one or more exemplary embodiments. For descriptive convenience, a method of manufacturing a touch sensor will be described with reference to the touch sensor TSP of FIGS. 1 to 4.

Figure 12:
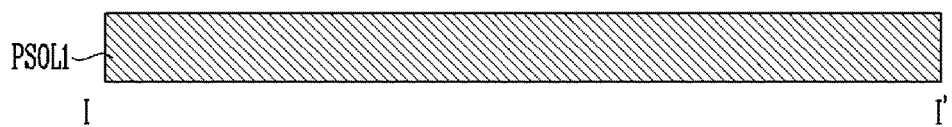
FIGS. 12 to 23 are respective cross-sectional views of a touch sensor at various stages of manufacture, according to one or more exemplary embodiments.

Referring to FIG. 12, a first photosensitive organic layer PSOL1 is applied. The first photosensitive organic layer PSOL1 is a negative photosensitive material. In one or more exemplary embodiments, a material of the negative photosensitive organic layer may include an acryl-based material or a siloxane-based material. It is contemplated, however, that the touch sensor may also be manufactured using an organic layer having positive photosensitivity. Although not illustrated, the first photosensitive organic layer PSOL1 may be formed on a substrate or any suitable underlying layer, such as a layer of an electronic device.

Figure 13:
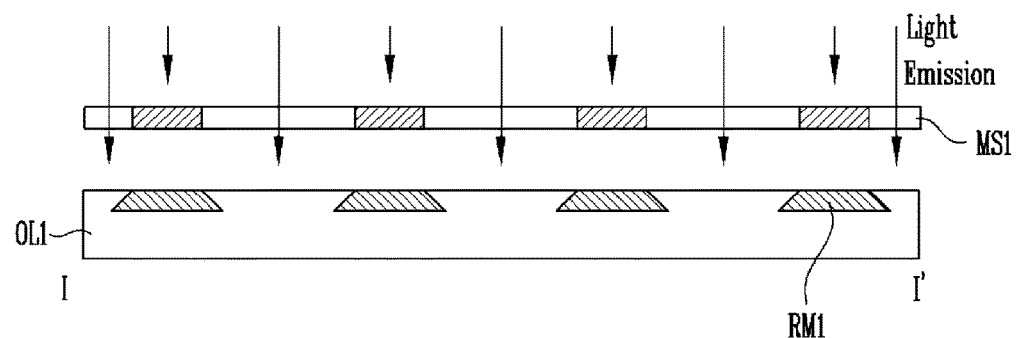

As seen in FIG. 13, a first organic layer OL1 may be formed from the first photosensitive organic layer PSOL1 by irradiating light to a portion of the first photosensitive organic layer PSOL1. Light is irradiated onto a portion of the first photosensitive organic layer PSOL1 utilizing a first mask MS1, and the portion to which the light is irradiated, is cured. The first organic layer OL1 is generated from the first photosensitive organic layer PSOL1 by the curing. The portion of the first photosensitive organic layer PSOL1, to which light is not irradiated, is not cured and is left as a first residue RM1. A slope angle of first conductive patterns CL1 is determined according to a manner of irradiation. For example, the slope angle of the first conductive patterns CL1 may be determined by an intensity and a focus of a light source (not illustrated), a distance between the light source (not illustrated) and the first photosensitive organic layer PSOL1, and the like, during the exposure.

Figure 14:
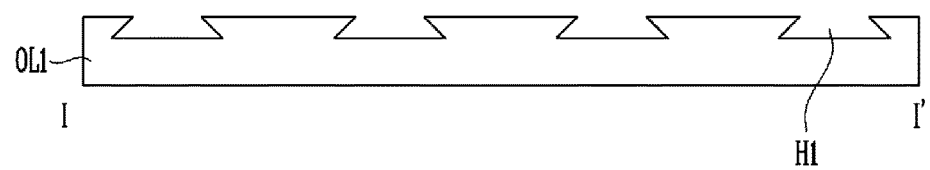

With reference to FIG. 14, first recesses H1 are formed by removing the portion of the first photosensitive organic layer PSOL1 that is not cured. In one or more exemplary embodiments, when a liquid (for example, a developer) that does not react with the cured first organic layer OL1 and reacts with the first photosensitive organic layer PSOL1 contacts the first residue RM1 and, thereby, removes the first residue RM1. The removal of the first residue RM1 forms the first recesses H1 in the first organic layer OL1.

Figure 15:
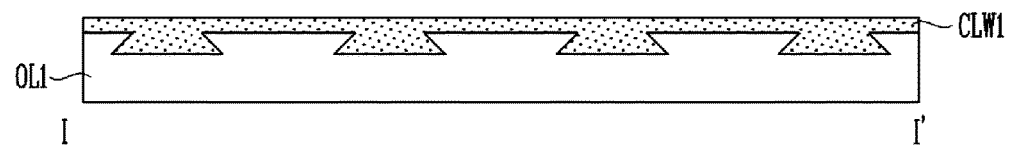

Referring to FIG. 15, a first conductive layer CLW1 is formed on an upper surface and the first recesses H1 of the first organic layer OL1. In one or more exemplary embodiments, the first conductive layer CLW1 may be formed by a layer forming method, such as a sputtering process, having sufficient step coverage. The first conductive layer CLW1 is formed on both the upper surface of the first organic layer OL1 and the first recesses H1 of the first organic layer OL1.

Figure 16:
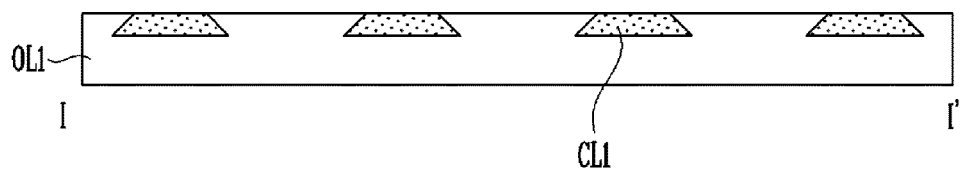

As seen in FIG. 16, a portion of the first conductive layer CLW1 that is formed on the upper surface of the first organic layer OL1 is removed, leaving the first conductive patterns CL1 formed in the first recesses H1. When an upper surface of the first conductive layer CLW1 is wet-etched or dry-etched, the portion of the first conductive layer CLW1 formed on the upper surface of the first organic layer OL1 may be entirely removed, and the portions of the first conductive layer CLW1 formed in the first recesses H1 may be left. That is, the first conductive patterns CL1, that is the portions of the first conductive layer CLW1 formed in the first recesses H1, are left.

According to one or more exemplary embodiments, the first conductive patterns CL1 may be formed in the first recesses H1 of the first organic layer OL1 as shown with reference to FIGS. 15 and 16; however, exemplary embodiments are not limited thereto. In one or more exemplary embodiments, the first conductive patterns CL1 may be formed by a method of directly filling the first recesses H1 with a material having relatively low specific resistance. For example, a polymer-based material, which has a relatively low specific resistance and is curable, may be directly patterned in the first recesses H1, and the patterned polymer-based material may also be cured by applying heat or ultraviolet rays.

Figure 17:
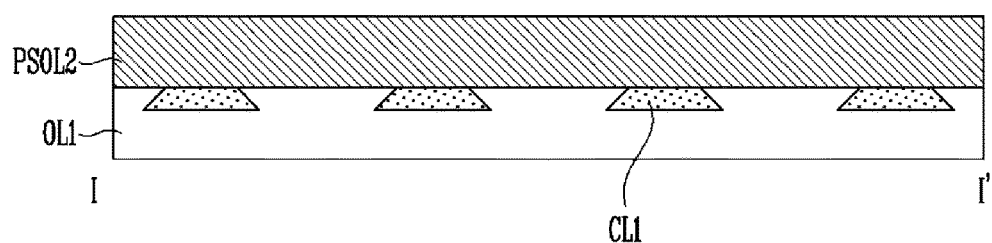

With reference to FIG. 17, a second photosensitive organic layer PSOL2 is formed on at least a portion of the first organic layer OL1 and the first conductive patterns CL1.

Similar to FIG. 12, the second photosensitive organic layer PSOL2, before being cured, is applied on at least a portion of the first organic layer OL1 and the first conductive patterns CL1.

Figure 18:
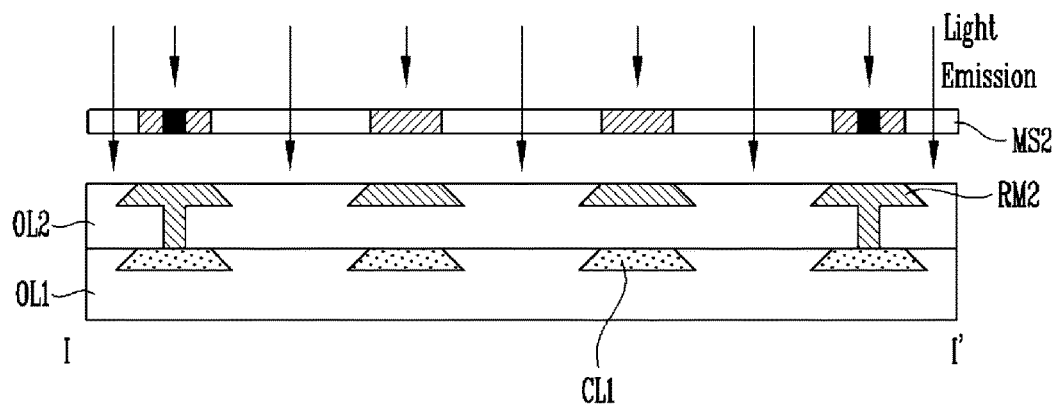

Referring to FIG. 18, a second organic layer OL2 may be formed from the second photosensitive organic layer PSOL2 by irradiating light to a portion of the second photosensitive organic layer PSOL2. Similar to FIG. 13, light is irradiated onto a portion of the second photosensitive organic layer PSOL2 using a second mask MS2, and the portion that the light is irradiated is cured. The second organic layer OL2 is generated from the second photosensitive organic layer PSOL2 by the curing. The portion of the second photosensitive organic layer PSOL2, to which light is not irradiated, is not cured and is left as a second residue RM2. A slope angle of the second conductive patterns CL2 is determined according to a manner of the irradiation and a formation of the second mask MS2. In one or more exemplary embodiments, the slope angle of the second conductive patterns CL2 may be determined by an intensity and a focus of a light source (not illustrated), a distance between the light source (not illustrated) and the second photosensitive organic layer PSOL2, and the like, during the exposure process. It is noted that, unlike the first mask MS1, the second mask MS2 may be a halftone mask. In this manner, a portion of the second residue RM2 has a relatively larger thickness, so that the portion of the second residue RM2 may be in contact with a portion of the first conductive patterns CL1. Further, the other portion of the second residue RM2 has a relatively smaller thickness, so that the other portion of the second residue RM2 is not in contact with the first conductive patterns CL1.

Figure 19:
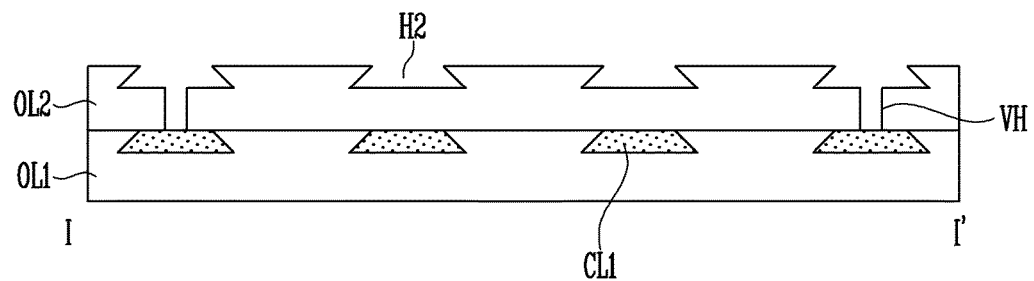

As seen in FIG. 19, second recesses H2 are formed by removing the portion of the second photosensitive organic layer PSOL2 that is not cured during the second exposing operation. Similar to FIG. 14, when a liquid that does not react with the cured second organic layer OL2 and reacts with the second photosensitive organic layer PSOL2, contacts the second residue RM2 and, thereby, removes the second residue RM2. In this manner, the corresponding second recesses H2 are formed where the second residue RM2 existed in the second organic layer OL2. The portion of the second residue RM2 that has been in contact with the first conductive patterns CL1 is removed, so that the second organic layer OL2 is formed with via-holes VH.

Figure 20:
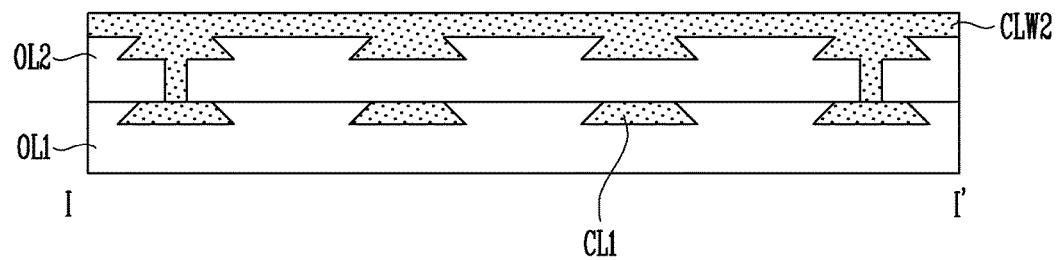

With reference to FIG. 20, a second conductive layer CLW2 is formed on an upper surface of the second organic layer OL2, the second recesses H2, and the via-holes VH. In one or more exemplary embodiments, the second conductive layer CLW2 may be formed by a layer forming method, such as a sputtering process, having sufficient step coverage. The second conductive layer CLW2 is formed on both the upper surface of the second organic layer OL2, the second recesses H2, and the via-holes VH. To this end, a portion of the second conductive layer CL22 is connected with the portion of the first conductive layer CL1 exposed by the via-holes VH formed in the second organic layer OL2.

Figure 21:
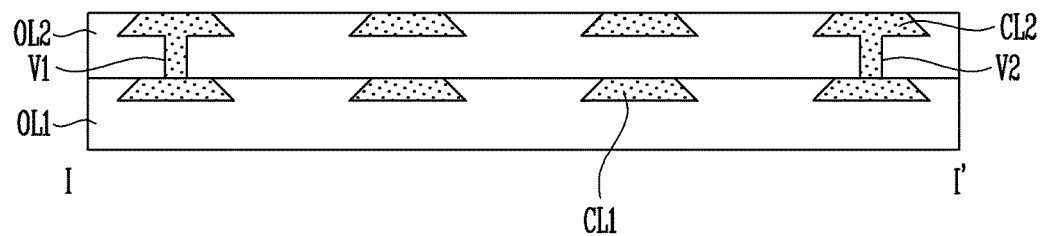

Referring to FIG. 21, the portion of the second conductive layer CLW2 that is formed on the upper surface of the second organic layer OL2 is removed, leaving the second conductive patterns CL2. When the surface of the second conductive layer CLW2 is wet-etched or dry-etched, the portion of the second conductive layer CLW2 formed on the upper surface of the second organic layer OL2 is entirely removed, and the portions of the second conductive layer CLW2 formed within the second recesses H2 and the via-holes VH are left. That is, the second conductive patterns CL2, that are the portions of the second conductive layer CLW2 formed within the second recesses H2, is left. Thus, as illustrated in FIGS. 3, 4, and 21, the second conductive patterns CL2 are formed.

According to one or more exemplary embodiments, the second conductive patterns CL2 and the via-holes VH may be formed as shown and described in association with FIGS. 20 and 21, however, exemplary embodiments are not limited thereto. In one or more exemplary embodiments, the second conductive patterns CL2 may be formed using a method of directly filling the second recesses H2 and the via-holes VH with a material having a relatively low specific resistance. For example, a polymer-based material, which has a relatively low specific resistance and is curable, may be directly patterned in the second recesses H2 and the via-holes VH. In this manner, the patterned polymer-based material may also be cured by applying heat or ultraviolet rays.

Figure 22:
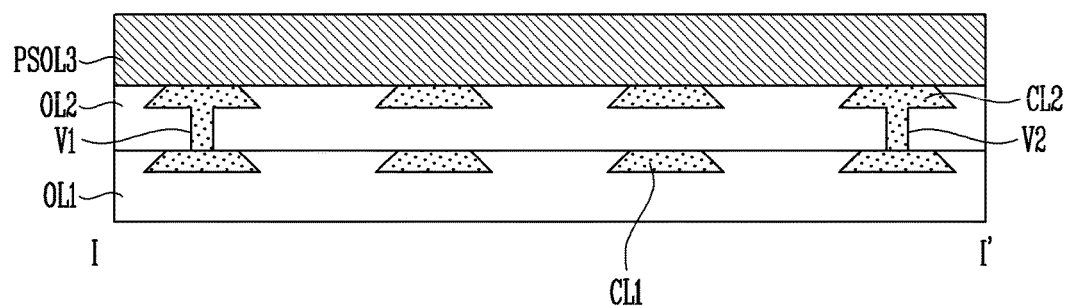

As seen in FIG. 22, a third photosensitive organic layer PSOL3 is formed on at least a portion of the second organic layer OL2 and the second conductive patterns CL2. Similar to FIGS. 12 and 17, the third photosensitive organic layer PSOL3 is applied on at least a portion of the second organic layer OL2 and the second conductive patterns CL2.

Figure 23:
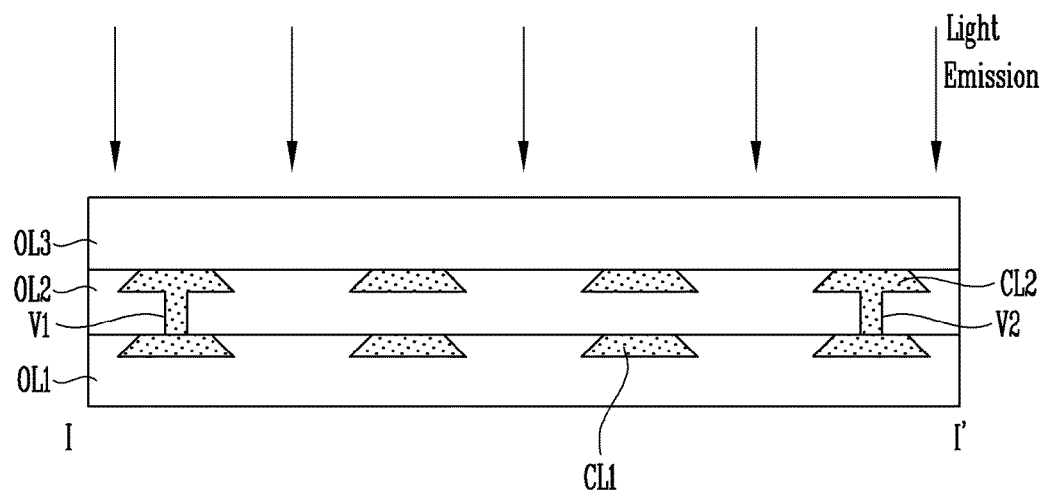

With reference to FIG. 23, a third organic layer OL3 is generated from the third photosensitive organic layer PSOL3 by irradiating light to at least a portion of the third photosensitive organic layer PSOL3. Unlike in FIGS. 13 and 18, the third photosensitive organic layer PSOL3 is entirely exposed without a mask, so that the entirety of the third photosensitive organic layer PSOL3 is cured and the third organic layer OL3 is generated. However, this is for illustrative purposes, and when the third organic layer OL3 requires patterning, the third organic layer OL3 may be patterned by irradiating light to a portion of the third photosensitive organic layer PSOL3 using a mask.

According to one or more exemplary embodiments, the conductive patterns used as electrodes are buried in organic layers. In this manner, stress to the conductive patterns may be reduced when a touch sensor is bent by, for example, enabling the bending stress to transfer from the conductive electrodes to organic layers including the conductive electrodes formed at least partially therein. In this manner, the touch sensor may be more robust to stress caused by the bending.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a touch sensor, comprising:
    forming a first photosensitive organic layer;
    exposing a first portion of the first photosensitive organic layer to a first light to form a first organic layer;
    removing second portions of the first photosensitive organic layer unexposed to the first light to form first recesses in the first organic layer;
    forming first conductive patterns in the first recesses;
    forming a second photosensitive organic layer on the first organic layer and the first conductive patterns;
    exposing a first portion of the second photosensitive organic layer to a second light to form a second organic layer;

removing second portions of the second photosensitive organic layer unexposed to the second light to form second recesses in the second organic layer; and forming second conductive patterns in the second recesses, wherein:
- some of the first and second conductive patterns form a driving line of a touch sensor, the driving line extending in a first direction; and
- some of the first and second conductive patterns form a sensing line of the touch sensor, the sensing line extending in a second direction different from the first direction.

2. The method of claim 1, further comprising:

forming a third photosensitive organic layer on the second organic layer and the second conductive patterns; and exposing the third photosensitive organic layer to a third light to form a third organic layer.

3. The method of claim 1, wherein forming the first conductive patterns in the first recesses comprises:

forming a conductive layer on a surface of the organic layer comprising the first recesses, the conductive layer extending into the first recesses; and removing at least a portion of the conductive layer disposed outside the first recesses.

4. The method of claim 1, wherein:

the first conductive patterns are formed comprising first protrusions extending out of the first recesses; and/or the second conductive patterns are formed comprising second protrusions extending out of the second recesses.

5. The method of claim 1, wherein:

some of the second recesses are formed comprising via-holes exposing portions of some of the first conductive patterns; and second conductive patterns formed in the some of the second recesses are electrically connected, through the via-holes, to the some of the first conductive patterns exposed by the via-holes.

* * * * *